United States Statutory Invention Registration [19]

[11] Reg. Number: H177

Saiveau et al. [43] Published: Dec. 2, 1986

[54] FUEL HANDLING SYSTEM FOR A NUCLEAR REACTOR

[75] Inventors: James G. Saiveau, Hickory Hills; William J. Kann, Park Ridge; James P. Burelbach, Glen Ellyn, all of Ill.

[73] Assignee: The United States of America as represented by the United States Department of Energy, Washington, D.C.

[21] Appl. No.: 795,606

[22] Filed: Nov. 6, 1985

[51] Int. Cl.[4] ..... G21C 19/20

[52] U.S. Cl. ..... 376/261; 376/272; 376/264; 376/362; 376/270; 376/404

*Primary Examiner*—Harvey E. Behrend

*Attorney, Agent, or Firm*—Hugh W. Glenn; Robert J. Fisher; Judson R. Hightower

[57] ABSTRACT

A pool type nuclear fission reactor has a core, with a plurality of core elements and a redan which confines coolant as a hot pool at a first end of the core separated from a cold pool at a second end of the core by the redan. A fuel handling system for use with such reactors comprises a core element storage basket located outside of the redan in the cold pool. An access passage is formed in the redan with a gate for opening and closing the passage to maintain the temperature differential between the hot pool and the cold pool. A mechanism is provided for opening and closing the gate. A lifting arm is also provided for manipulating the fuel core elements through the access passage between the storage basket and the core when the redan gate is open.

3 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL HANDLING SYSTEM FOR A NUCLEAR REACTOR

CONTRACTUAL ORIGIN OF THE INVENTION

The United States Government has rights in this invention pursuant to contract number W-31-109-EN-G-38, between the U.S. Department of Energy and the University of Chicago representing Argonne National Laboratory.

BACKGROUND OF THE INVENTION

A nuclear reactor has a core defining many parallel passages. Within the core are a plurality of fuel core assemblies containing fuel elements of radioactive material and a plurality of control elements supported in interrelated matrixes. The fuel elements create heat. The presence of the control elements relative to the fuel elements determines the reactivity of the fuel, and thus the output of the reactor. Coolant is forced through the passages over the fuel core assemblies and control elements for transferring the generated heat to a heat exchange mechanism, whereby steam can be produced externally of the reactor and used to perform useful work.

One form of nuclear reactor, known as the liquid metal fast breeder reactor uses molten sodium as the coolant. A pool type liquid metal nuclear reactor has a pool of molten coolant (typically sodium), a core submerged in the pool and pump and piping for circulating the coolant from a "cold pool" upwardly through the core to an overlying "hot pool" area and then through a heat exchanger and back to the cold pool at a reduced temperature. An intermediate fluid line through the heat exchanger picks up the heat for transfer to heat conversion means outside of the reactor.

Some reactors provide for a separate fuel storage vessel of coolant outside of the reactor and a storage basket for spent core assemblies in this vessel. Storage is necessary for spent fuel to allow fission decay cool down. New core assemblies are also positioned in the storage basket prior to use to allow temperature equalization.

In some reactors the storage basket is located in the reactor vessel, which eliminates the need for a separate storage vessel. Again, replacement of the core assemblies is periodically required. Accordingly, internal fuel handling equipment, including a lifting mechanism, are provided within the reactor vessel. The assembly handling equipment generally includes an exit ramp which allows for the mechanical movement of the core assemblies to and from the reactor vessel.

When the storage basket is contained in the reactor vessel, it normally is placed in the redan or hot pool area for it to be accessible to the assembly handling machine. This is not preferred, as the storage basket and assembly handling equipment are subjected to higher temperature and thermal transients. In the present system the storage basket and handling system are located in the cold pool, in order to reduce the temperature of the core assemblies during cool down. In addition, cooler temperatures reduce wear on the assembly handling equipment. However, a means of opening and closing the redan or "hot pool" container is required for such a system.

Prior art patent showing various methods of refueling nuclear reactors may be found in the following U.S. Patents; U.S. Pat. Nos.; 4,366,113, Gigou; 3,935,062, Keller et al.; 3,635,792, Barker; 4,450,134, Soot et al.; 3,600,277, Germer; and 3,271,262, Hutchinson et al.

OBJECTS AND SUMMARY OF THE INVENTION

This invention relates generally to nuclear reactors and more particularly to an apparatus for moving fuel core assemblies from within a redan in a nuclear reactor.

A pool type nuclear fission reactor has a core, a plurality of core assemblies containing fuel elements and a redan structure, i.e. a container for confining coolant as a hot pool at a first end of the core. The redan usually is constructed as a vessel which separates the coolant in the hot pool from coolant in the cold pool at a second end of the core. It is an object of the present invention to provide a fuel core assembly handling system with a storage basket in the cold pool area of the reactor, and to provide means for opening and closing a portion of the redan in order to utilize such a system. An access passage in the redan structure allows such movement of core assemblies from the hot pool into the cold pool for storage for the fuel core assemblies located in the storage basket. A redan gate is provided for selectively closing the access passage through the redan structure. The gate is substantially liquid tight when closed. A mechanism is also provided for opening and closing the gate. An additional mechanism commonly referred to as a fuel handling arm is provided for manipulating the fuel core elements back and forth between the storage basket and the core when the redan gate is open. In addition, the fuel handling arm removes fuel core assemblies from the storage basket and places them on a conveyor for removal from the reactor.

DETAILED DESCRIPTION OF THE PREFERRED EMBODIMENT

Figure 1:
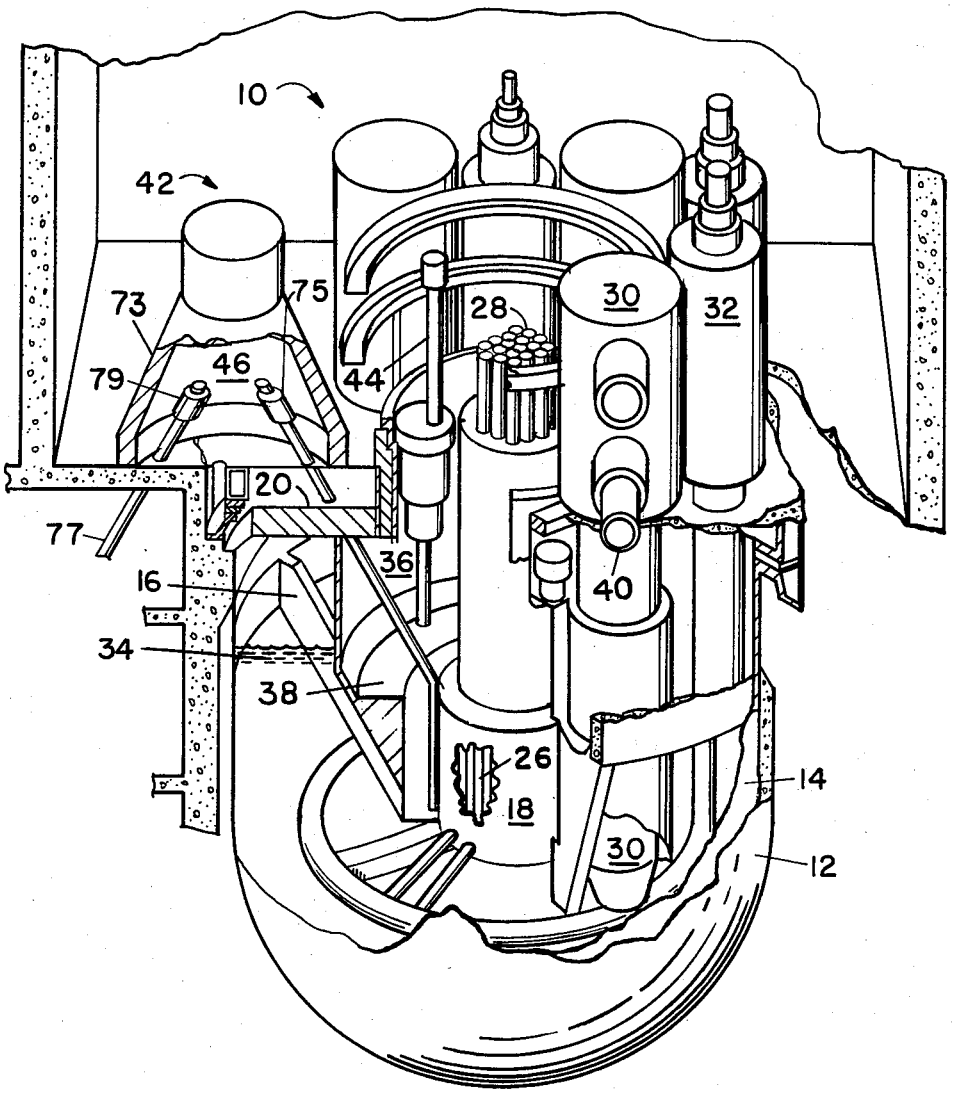
FIG. 1 of the drawings is a front perspective view, partially cut away, of a nuclear reactor used in conjunction with the present invention.

While the present invention is susceptible of embodiment in many different forms, there is shown in the drawings and will herein be described in detail, several specific embodiments with the understanding that the embodiments illustrated are an exemplification of the principals of the invention and are not intended to limit the invention to the embodiments illustrated.

Referring now to the drawings, and in particular to FIG. 1, a pool type nuclear fission reactor 10 is shown having guard vessel 12 about its periphery. A reactor vessel 14 is disposed within guard vessel 12. Similarly, a core support structure 16 is disposed within reactor vessel 14. A reactor core 18 supported by the core support structure 16 is disposed within the reactor vessel 14. A deck 20 closes the open top of the reactor.

Core 18 of nuclear reactor 10 has a plurality of parallel passages 24 (best seen in FIG. 6) within which fuel core assemblies 26 and control elements 28 are supported in interrelated matrixes. The clustering together of radioactive fuel core assemblies 26 creates heat. The presence of the control elements 28 relative to the fuel core assemblies 26 determines the reactivity of the fuel, and thus the output of the reactor. Coolant is forced through the passages 24 over the core assemblies 26 and control elements 28 for transferring the generated heat to a heat exchanger mechanism 30 or the like whereby steam can be produced externally of the reactor 10 and used to perform useful work, such as drawing electric generators.

Nuclear reactor 10, in one embodiment, is a liquid metal fast breeder reactor which uses molten sodium as the coolant. A pool type liquid metal nuclear reactor has a pool of molten coolant (typically sodium), a core 18 submerged in the pool and pump 32 and piping for circulating the coolant from a "cold pool area" 34 upwardly through the core 18 to an overlying "hot pool area" 36 contained within a redan structure 38 which separates cold pool area 34 from hot pool area 36 and then through heat exchanger 30 and back to the cold pool area 34 at a reduced temperature. An intermediate fluid line 40 through the heat exchanger 30 picks up the heat for transfer to heat conversion means (not shown) outside of the reactor 10.

Figure 2:
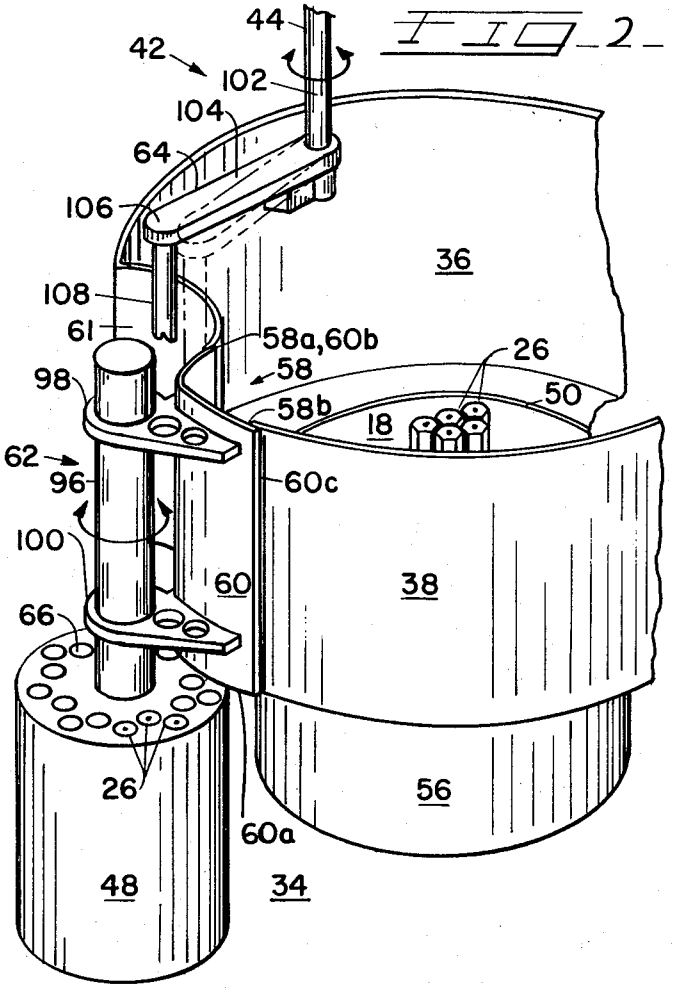
FIG. 2 of the drawings is a front perspective view of the redan structure and fuel handling system of the nuclear reactor of FIG. 1.

As seen in FIGS. 1 and 2, nuclear fuel core assemblies 26 and control elements 28 are arranged in matrix patterns within the core 18. Replacement of these fuel core assemblies 26 are periodically required. Accordingly, internal fuel handling equipment 42, including a lifting mechanism 44, are provided in the reactor vessel 14. The assembly handling equipment 42 generally includes a conveyor system 46 (FIG. 1) which allows for the mechanical movement of the fuel core assemblies 26 into or from the reactor vessel 14.

As seen in FIG. 2, a storage basket 48 for spent fuel core assemblies 26 is provided in reactor vessel 14. Storage is necessary for spent fuel to allow fission decay cool down, and new fuel core assemblies 26 are positioned in the storage basket 48 prior to use to allow temperature equalization. Storage basket 48 is placed in the cold pool area 34 for it to be more accessible to the fuel handling equipment 42. In addition, this location is preferred as the storage basket 48 and assembly handling equipment 42 are subjected to lower temperature and thermal transients.

As further seen in FIG. 2, redan structure 38 confines coolant in a hot pool area 36 at a first end 50 of the core 18 Redan structure 38 is preferably constructed as a vessel having vertical walls 38*c*. The redan structure 38 separates the coolant in the hot pool area 36 from coolant in the cold pool area 34 at a second end 56 of the core. An access passage 58 in the redan structure 38 allows movement of fuel core assemblies 26 from the hot pool area 36 into the cold pool area 34 for storage in the storage basket 48. A redan gate 60 is provided for selectively closing the access passage 58 and the redan structure 38. The gate is substantially liquid tight when closed. A mechanism 62 is also provided for opening and closing the gate 60. Fuel handling arm 64 is provided for manipulating the fuel core assemblies 26 back and forth between the storage basket 48 and the core 18 when the redan gate 60 is open. In addition, the fuel handling arm 64 removes fuel core assemblies 26 from the storage basket 48 and places them on a conveyor 46 (best seen in FIG. 1) for removal from the reactor 10.

Figure 3:
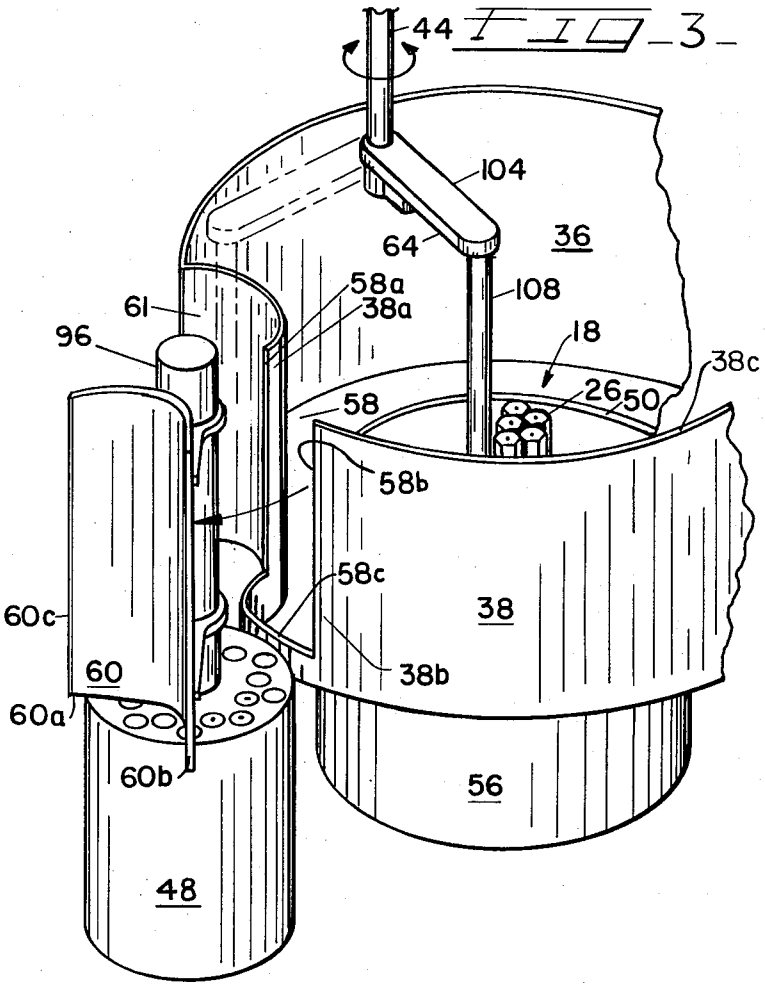
FIG. 3 of the drawings is a front perspective view of the redan structure and fuel handling system of FIG. 2 showing in particular the redan gate in an open position.
Figure 4:
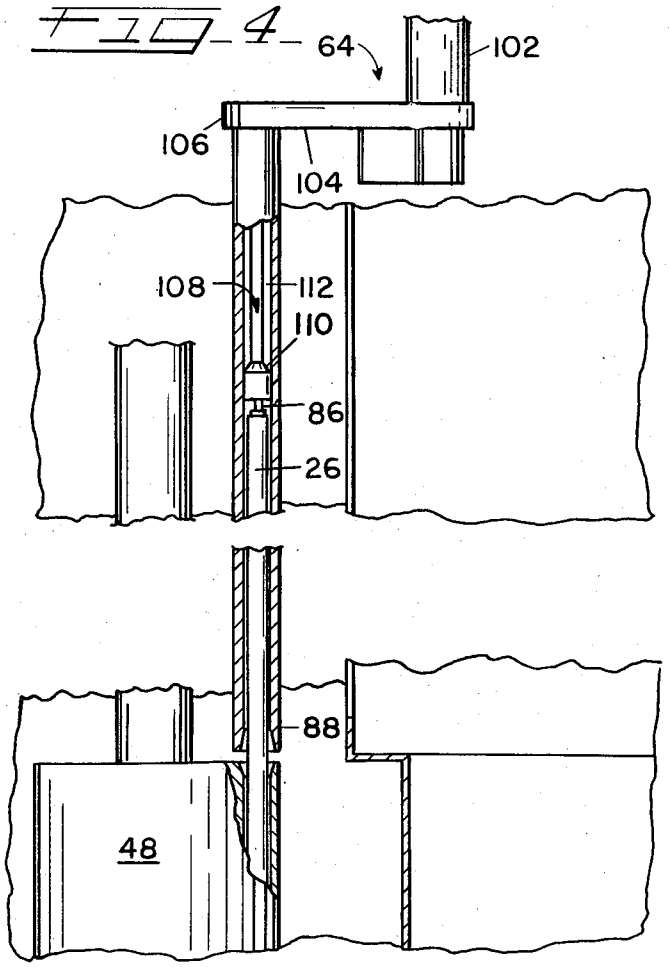
FIG. 4 of the drawings is a vertical section of the fuel handling system of FIG. 3 showing in particular transfer of fuel core assembly from the hot pool to the storage basket.

As best seen in FIG. 3 of the drawings, when redan gate 60 is in an open position, assembly handling arm 64 may be moved into position for engagement with one of the fuel core assemblies 26. Assembly handling arm 64 may then be raised with fuel core assembly 26 attached thereto and moved through passage 58 in redan 38. Once located in position over storage basket 48, as seen in FIG. 4, assembly handling arm 64 may be lowered so as to telescopically engage fuel core assembly 26 in tubular apertures 66 in storage basket 48.

As further seen in FIGS. 2 and 3, redan gate 60 is constructed in a curved configuration, and is positioned so as to matingly engage with vertical edges 58*a* and 58*b* of access passage 58. In addition, bottom surface 60*a* of redan gate 60 is slidingly positioned on bottom edge 58*c* of access passage 58. Redan gate 60 is outwardly curved so that vertical edge 60*b* of redan gate 60 is matingly engaged against vertical edge 58*a* of access passage 58 on the inside wall 38*a* of redan structure 38. Conversely, vertical edge 60*c* of redan gate 60 extends onto the outside wall 38*b* of redan structure 38 when redan gate 60 is closed. As a result, a substantial liquid tight seal is created between redan gate 60 and access passage 58.

As best seen in FIG. 3, when redan gate 60 is pivoted in a clockwise direction, vertical edge 60*c* of redan gate 60 swings about to the opposite side of storage basket 48. Vertical edge 60*b* of redan gate 60 passes through access passage 58 until it is also located on the opposite side of storage basket 48 from redan structure 38. Sealing engagement is also accomplished by having redan structure 38 inwardly curved in section 61 so that vertical edge 58*a* interlaps with vertical edge 60*b*. As a result, a simple effective method of sealing redan gate 60 to the redan 38 is provided.

As mentioned previously, redan gate 60 is opened and closed by gate closing mechanism 62. In the embodiment shown, gate closing mechanism 62 consists of a pivotable shaft 96 vertically disposed adjacent to redan gate 60 and connected thereto by a pair of support braces 98 and 100. Pivotable shaft 96 in turn may be pivoted by a drive train (not shown) connected to an electric motor.

Storage basket 48 may similarly be rotated about shaft 96. Mechanical means for causing such rotation, although not shown in the drawings, consist of a centrally disposed shaft extending through shaft 96 and fixedly attached to storage basket 48 for effecting rotation thereof. Such a centrally disposed shaft, would of course be mounted in a bearing mechanism within shaft 96 and would be connected at one end to a mechanical drive and power source such as an electric motor. In rotation both of the storage basket and of the redan gate, because of the precise positioning required, a stepper type electric motor is utilized for precisely positioning both the redan gate and the storage basket. A computerized control is also utilized.

Figure 5:
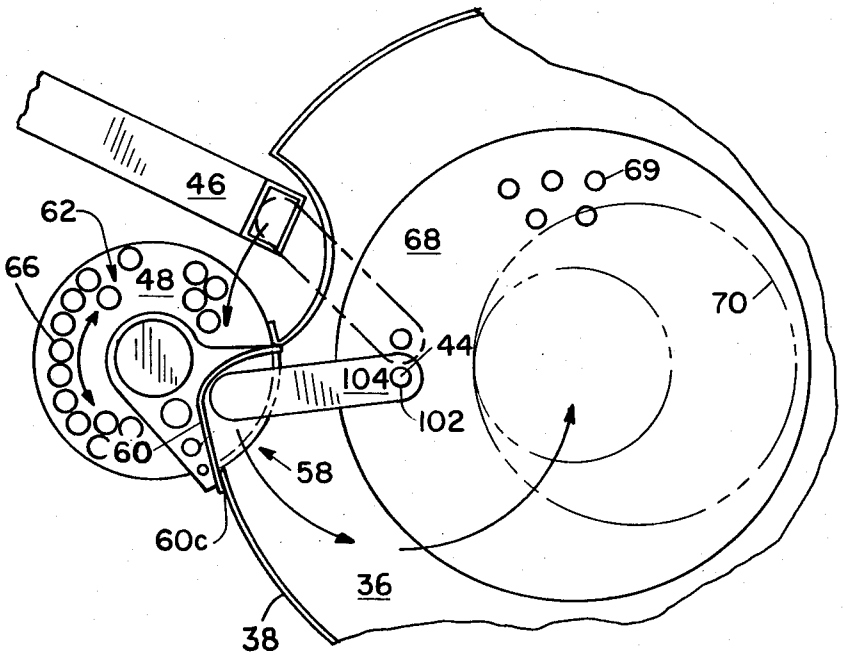
FIG. 5 of the drawings is a top view of the redan and fuel handling system of FIGS. 2 and 3 of the drawings.

Turning now to FIGS. 3 and 5 of the drawings, core assemblies 26 are positioned for telescopic engagement with fuel handling arm 64 by means of rotatable plugs 68 and 70. Tubular apertures 69, are vertically positioned in large plug 68 so that when plugs 68 and 70 are rotated, fuel core assemblies 26 are positioned beneath fuel handling arm 64. Fuel handling arm 64 is then lowered for engagement with fuel core assemblies 26. Individual core assemblies 26 may then be raised and moved through access passage 58, past open redan gate 60, and deposited in storage basket 48.

In addition to transfer from core 18 to storage basket 48, core assemblies 26 may be raised from storage basket 48 after cool down and positioned on conveyor system 46 for removal from the reactor 10. As best seen in FIG. 1, conveyor mechanism 46 comprises, in this embodiment, an inclined conveyor which opens into a shielded chamber 73. A valve 75 is provided to allow passage of the fuel core assemblies into chamber 73. An oppositely disposed conveyor 77 exits from the chamber 73. A valve 79 is interposed on conveyor 77 to seal the chamber 73, except when fuel core elements 26 are being passed therethrough. In this manner, both spent fuel core assemblies and new fuel core assemblies may be transferred into or out of reactor vessel 14.

Figure 7:
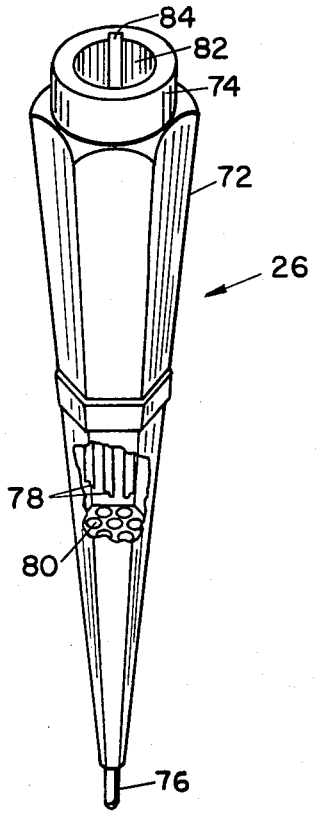
FIG. 7 of the drawings is a front perspective view, partially cut away, of a core assembly for use in the nuclear reactor of FIG. 1 of the drawings.

Turning now to FIG. 7 of the drawings an individual fuel core assembly 26 is shown. Fuel core assembly 26 is constructed as a tubular duct 72 having a top end fitting 74 and a bottom end fitting 76. Contained within the tubular duct 72 are a plurality of fuel elements 78 which are vertically disposed therein. Separating the fuel elements are grid plates 80 which precisely position the fuel elements 78. At the top of tubular duct 72 is top end fitting 74. Top end fitting 74 contains an aperture 82 and, in this embodiment, a slot 84. Slot 84 is adapted for engagement with a corresponding claw assembly 86 (best seen in FIG. 4) moveable towards the distal end 88 of fuel assembly handling arm 64. Following such engagement, fuel assembly, 26 may be raised and lowered or moved from side to side by means of arm 64.

Figure 6:
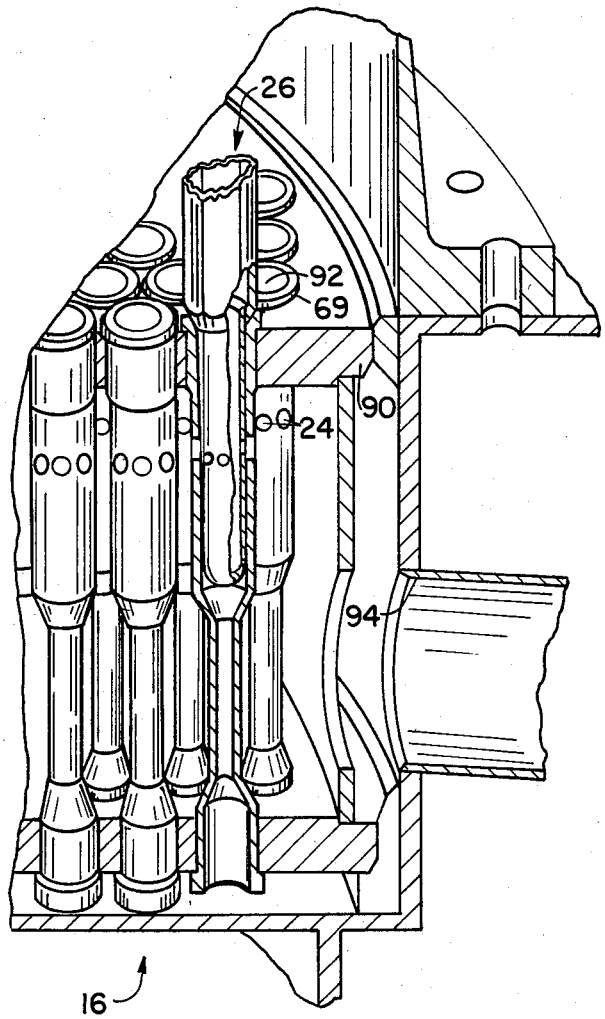
FIG. 6 of the drawings is a front perspective cut away view of a portion of the nuclear reactor of FIG. 1 of the drawings showing in particular a core assembly being removed from the core support grid in the reactor.

As shown in FIG. 6 of the drawings, core support structure 16 has a core support grid 90 containing a plurality of vertical tubular passages 92 through core support structure 16. Tubular passages 92 are adapted for telescopic engagement with fuel core assemblies 26. Parallel passages 24 allow the flow of coolant from coolant inlet 94 through the fuel core assemblies 26 and control elements 28.

As also shown in FIGS. 2, 3 and 4 of the drawings, fuel handling equipment 42 utilizes fuel handling arm 64 for placing fuel elements 26 in core 18, for removing fuel elements 26 from core 18 and placing them into storage basket 48, and for removing fuel elements 26 from storage basket 48 and placing them onto conveyor 46. This is accomplished by providing a mechanism for both raising and lowering fuel handling arm 64 and for pivoting fuel handling shaft 102 of fuel handling arm 42 either clockwise or counter clockwise. Such clockwise or counter clockwise movement causes rotation of laterally extending beam 104. Rotation of fuel handling shaft 102 is effected by means of a power source such as an electric motor, (not shown) connected by means of a drive train (not shown) to shaft 102. Again, an electrically driven stepper type motor is preferably utilized which may be controlled by means of a microprocessor.

As best shown in FIG. 4, at the distal end 106 of beam 104 is a downwardly extending gripper mechanism 108. Gripper mechanism 108 utilizes a wire pulley mechanism 112 which is in turn connected to its gripper head 110. Gripper head 110 may contain a claw assembly 86 for gripping the top end 74 of fuel element 26. Alternatively, gripper head 110 may contain a key (not shown) adapted for insertion into and interlocking with slot 84 shown in FIG. 7. Following such interlocking, fuel handling assembly 42 may be raised so as to raise fuel core assemblies 26 either from storage basket 48 or from core 18. As a result of the provision of the abovelisted fuel handling assembly 44, fuel core assemblies 26 may be safely and efficiently conveyed into core 18 or removed therefrom without maintaining a high transient temperature within reactor 10.

The foregoing description and drawings merely explain and illustrate the invention and the invention is not limited thereto except in so far as those who have the disclosure before them will be able to make modifications and variations therein without departing from the scope of the invention.

What is claimed is:

1. In a pool type nuclear fission reactor having a core, a plurality of fuel core elements and a redan structure in the form of a vessel for confining coolant in a hot pool area at a first end of said core separated from a cold pool area at a second end of said core, a fuel handling system comprising;

a core element storage basket located outside of said redan structure in said cold pool area;

an access passage in said redan structure:

a gate to close said passage;

means for opening and closing said gate; and means for manipulating said fuel core elements through said access passage between said storage basket and said core when said gate is open.

2. In a nuclear reactor having a core composed of a plurality of fuel core assemblies, a liquid coolant for passing through said core assemblies, a hot pool area and a cold pool area for said coolant, and a redan structure for separating said hot pool area from said cold pool area, said redan structure comprising:

a vertical wall assembly substantially concentrically disposed about said core assemblies, and having a passageway therethrough, said vertical wall assembly further having an inner wall, an outer wall and an inwardly curved section adjacent said passageway;

an outwardly curved moveable gate having first and second oppositely disposed vertical side edges;

means for moving said moveable gate into a first position substantially sealing said passageway, with said first vertical edge abutting against said inner wall of said wall assembly and said second vertical edge abuttig said outer wall of said vertical wall assembly so as to retain liquid coolant in said redan; and means for moving said moveable gate to a second position so as to open said passageway and allow the selected movement of said core assemblies into and out of said redan structure.

3. In a nuclear reactor having a core composed of a plurality of fuel core assemblies, a liquid coolant for passing through said core assemblies, a hot pool area and a cold pool area for said coolant, and a redan structure for separating said hot pool area from said cold pool area, an apparatus for moving said fuel core assemblies into and out of said redan structure comprising:

a moveable redan gate;

means for moving said gate to either an open or closed position;

a storage basket for storing said fuel core assemblies, said storage basket being positioned outside of said redan structure;

conveying means for conveying said fuel core assemblies into and out of said reactor; and means for moving said fuel core assemblies from said conveying means to said storage basket, from said storage basket through said moveable redan gate and into said reactor, and for the reverse movement thereof.

* * * * *